United States Patent [19]

Moss

[11] 4,103,751

[45] Aug. 1, 1978

[54] CHECK WEIGHING APPARATUS FOR ARTICLES

[75] Inventor: Alan Moss, Penketh, Nr. Warrington, England

[73] Assignee: Golden Wonder Limited, England

[21] Appl. No.: 769,383

[22] Filed: Feb. 17, 1977

[30] Foreign Application Priority Data

Feb. 19, 1976 [GB] United Kingdom ............... 6518/76

[51] Int. Cl.² ................... G01G 13/02; G01G 13/24
[52] U.S. Cl. ................................... 177/122; 177/114
[58] Field of Search ............... 177/1, 122, 123, 114

[56] References Cited

U.S. PATENT DOCUMENTS

| | | | |
|---|---|---|---|
| 3,134,449 | 5/1964 | Coffaro et al. | 177/123 X |
| 3,175,632 | 3/1965 | Rouban | 177/123 X |
| 3,195,662 | 7/1965 | Joiner et al. | 177/123 X |
| 3,498,395 | 3/1970 | Henry | 177/1 |
| 3,540,538 | 11/1970 | Connors et al. | 177/122 |
| 3,856,097 | 12/1974 | Bartlo et al. | 177/123 X |
| 3,938,601 | 2/1976 | Hobart | 177/123 X |
| 3,968,848 | 7/1976 | Cherney et al. | 177/123 |

*Primary Examiner*—George H. Miller, Jr.
*Attorney, Agent, or Firm*—Larson, Taylor and Hinds

[57] ABSTRACT

A check-weighing apparatus is provided wherein a conveyor feeds articles in a discrete manner onto a weighing device, the feeding of the articles being terminated, and the articles being removed from the weighing device, when a predetermined weight is attained. A receptacle receives a batch of articles from the conveyor and when a predetermined batch quantity is attained within the receptacle which is less than the predetermined weight referred to, the batch is released onto the weighing device. The conveyor then tops up the batch to the predetermined weight.

13 Claims, 3 Drawing Figures

U.S. Patent    Aug. 1, 1978    4,103,751
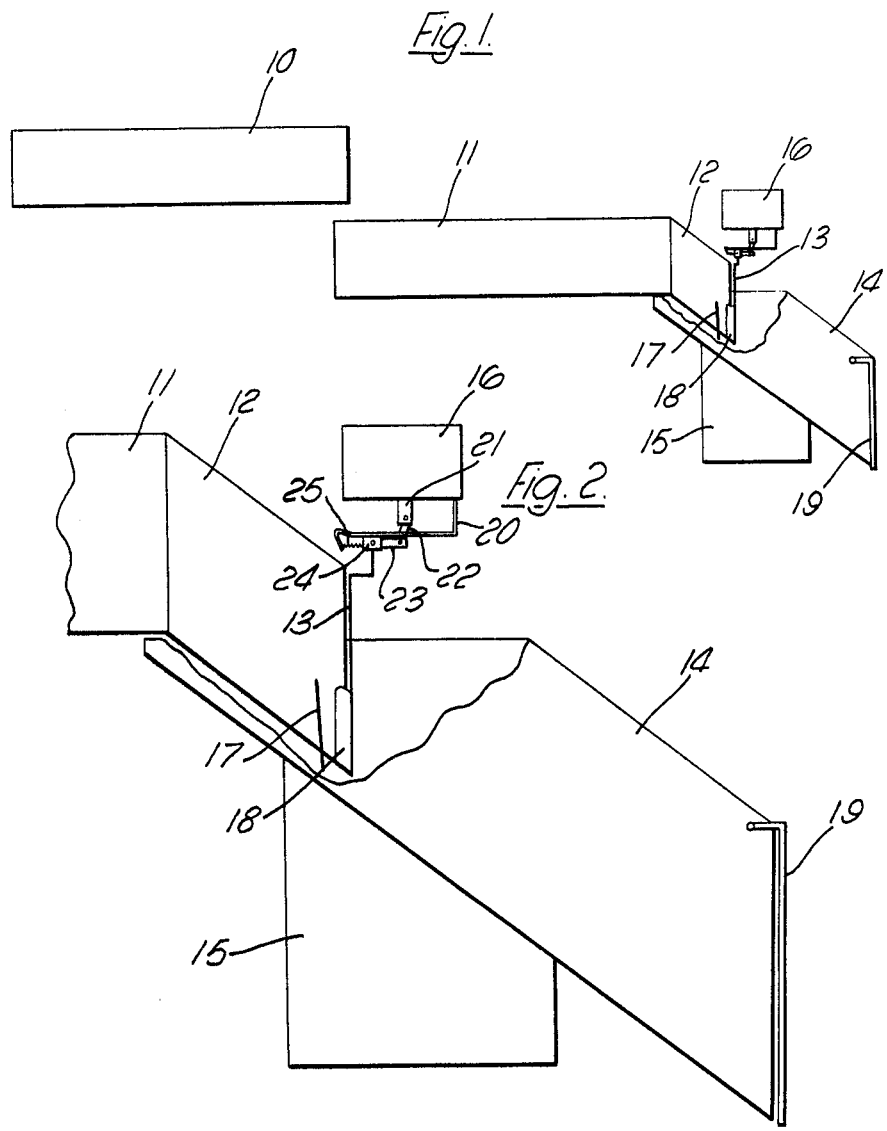
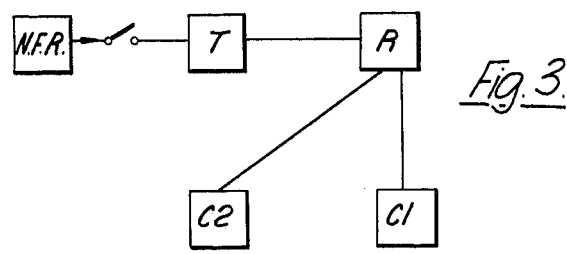

CHECK WEIGHING APPARATUS FOR ARTICLES

This invention relates to apparatus for check weighing articles and particularly but not exclusively to the check-weighing of foodstuffs such as potato crisps or similar low density snack food.

In known crisp check weighing and packing machines the crisps are conveyed by vibrating conveyors to a packing station. The crisps fall discretely from the end of the last conveyor into a downwardly sloping pan. The pan has a gate at its lowermost end behind which crisps are allowed to accumulate. The pan is mounted on weighing scales which indicate the weight of crisps accumulating behind the gate. When the scales indicate that a predetermined weight of crisps has accumulated, the vibrating conveyors halt, the gate opens and allows the crisps to fall into a waiting bag.

There are several problems associated with this check weighing procedure. Because crisps are light and irregularly shaped, it is difficult to supply a regular weight and quantity of crisps to the scale pan and thence to each bag. Additionally, since the only convenient method of introducing crisps into bags is by gravity feed, the momentum of the crisps falling into the pan causes the scales to read high thus tending to produce an unacceptably high percentage of bags of crisps whose contents are underweight. In order to minimize the number of underweight filled bags the rate of feed along the vibrating conveyors has to be increased. This increase in feed rate does reduce the number of underweight bags but also increases unacceptably the number of bags that are overweight.

It is an object of the present invention to provide an apparatus which improves the crisp feed to a packing machine, in particular to provide a commercially acceptable constant weight of crisps per bag. The apparatus is designed for addition to existing equipment for crisp packing.

According to the present invention there is provided check-weighing apparatus comprising a weighing device, conveyor means to feed articles discretely onto the weighing device, and first control means responsive on the attainment of a predetermined weight of articles on the weighing device to halt the feed of articles from the conveyor means and to remove the articles from the weighing device, characterised in that there is provided receptacle means to receive a batch of articles from the conveyor means, and second control means responsive on the attainment of a predetermined batch quantity within the receptacle means, being less than said predetermined weight of articles, to release said batch of articles to the weighing device and thereafter to permit the conveyor means to top up said batch on the weighing device to said predetermined weight.

By way of example the invention will now be described with reference to the accompanying diagrammatic drawings in which, FIG. 1 is a side elevation of a check weighing apparatus, FIG. 2 is an enlarged detail portion of the apparatus of FIG. 1, and FIG. 3 shows in block form a control unit for the apparatus of FIGS. 1 and 2.

Referring to FIGS. 1 and 2 a conveyor means comprising a first vibratory conveyor 10 is positioned above and partly overlapping a second vibratory conveyor 11. Conveyor 10 is arranged to supply conveyor 11 with potato crisps. Both conveyors are actuated by known vibrating means (not shown).

The second conveyor 11 is provided at its downstream end with a receptacle means comprising an integral chute 12 having in its lower (or downstream) portion a gate 13 arranged to be opened and shut by a solenoid 16 through a lever linkage 21, 22, 23, 24. Linkage and gate 13 are supported by a plate 20 depending from the solenoid 16.

When gate 13 is closed, chute 12 and gate 13 together form a pocket, otherwise receptacle, in which crisps falling off the conveyor 11 are allowed to accumulate.

When gate 13 is open, chute 12 is arranged to discharge crisps into a weighing device comprising a sloping pan 14 mounted on weighing scales 15. Chute 12 and pan 14 are parallel, that is, have a common inclination, thus minimizing the momentum of the crisps as they fall into the pan 14 for weighing. Pan 14 is provided at its bottom end with a gate 19 which is arranged to open when the scales 15 indicate that a predetermined weight of crisps has collected in the pan 14, and to be closed when there are no crisps in the pan.

Referring to FIG. 3, a first control means or known normal feed relay (not illustrated, but indicated by "n.f.r.") is in series with a second control means provided by a timer T and relay R in series. The timer T is activated by the normal feed relay which operates a crisp packing machine in known fashion. The relay R is in turn energised by the timer for whatever length of time the timer has been set.

The relay is in series with a pair of control units C1 and C2 which control the vibrator machinery (not illustrated) for the conveyors 10 and 11 respectively. When the relay is energised by the timer an impulse passes to each of the control units which consequently control the conveyors. The vibratory conveyors may therefore be controlled either by their conventional circuitry (n.f.r.) or by the timer via the relay.

The weighing scales is provided with signal generating devices to indicate (a) the presence of a predetermined weight of crisps in the pan 14, and (b) the absence of any crisps in the pan.

On receiving a signal from the weighing scales indicating that the predetermined weight has been attained, the normal feed relay opens gate 19, thus releasing the crisps from the pan 14 into a packaging bag (not shown) and switches off the vibratory conveyors to prevent an overload of crisps from entering the bag. When the pan is empty, the normal feed relay received signal (b) from the weighing scales, closes gate 19 and activates the second control means (the timer and relay).

On receiving the activating signal, the second control means closes gate 13 by means of solenoid 16 and restarts the vibratory conveyors, thus conveying crisps into the receptacle provided by chute 12 and gate 13. The size of the batch of crisps entering the chute is determined by the setting of the timer and is conveniently between ⅓ to ⅔ of the predetermined weight of the crisps entering the bag from the pan. When the desired quantity of crisps in the batch has been attained, the timer activates the relay to open gate 13 and release the batch into the empty pan 14. The gate 13 is then held open whilst further crisps from the conveyors follow the batch down the chute into the pan until the batch is topped up to the predetermined weight for a bag of crisps. When this occurs signal (a) is again generated and the cycle recommences.

The timing may be arranged that in practice it is convenient for gate 13 to shut practically simultaneously with the opening of gate 19, so that the vibratory movement of the conveyors ceases for only a very short period in the cycle.

It is convenient to provide a skirt 17 attached to the bottom surface of the chute 12 near its downstream end to prevent crisps from being knocked out of the chute 12 by the closing movement of the gate 13. It is likewise convenient to provide a flange 18 depending from the lowermost portion of gate 13 and overlapping the end of the chute 12 in order to close the chute more effectively.

It is found with the apparatus of the invention that a commercially acceptable constant weight of crisps in bags may be obtained.

The apparatus of the invention may be applied to batch-wise weighing and packaging of discrete products such as light density snack foods and particulate materials.

Modifications may be made within the scope of the invention. For example, the first control means (n.f.r.) may be arranged to close gate 13 simultaneously with the opening of gate 19 rather than first activate the second control means. It will be understood that "gate" includes closure members such as shutters, diaphragm, and butterfly valves, which may be useful in some circumstances.

Types of conveyor other than vibratory may be contemplated, such as belt conveyors. The control means may be electronic or fluidic circuits, or may be purely mechanical in nature. The control means may be arranged to control the speed of the conveyors rather than switching them on and off. Although two conveyors are described there may of course be more or even one. The chute 12 in some applications need not necessarily be integral with the conveyor means.

Other kinds of weighing devices such as strain gauges may be used in some applications.

What I claim is:

1. Check-weighing apparatus comprising,
   (a) a conveyor,
   (b) receptacle means for receiving articles from said conveyor,
   (c) a first gate in the receptacle means for providing an exit for articles from said receptacle means,
   (d) a weighing device comprising a weighing pan and means responsive to the weight in said weighing pan, the weighing pan being located beneath the exit from the receptacle means to receive articles therefrom,
   (e) means for releasing articles from the weighing pan,
   (f) first control means, responsive to the attainment of a predetermined weight of articles on the weighing pan, for releasing the predetermined weight of articles from the weighing pan and for halting the feed of articles to the receptacle means from the conveyor,
   (g) second control means for controlling the feed of articles from the conveyor into the receptacle means until a required quantity of articles is attained which is less than the predetermined weight of articles to be weighed by the weighing device, for, responsive to said required quantity being attained, opening the first gate and releasing the required quantity of articles into the weighing pan and for thereafter permitting the conveyor to feed through the receptacle means to top up the articles on the weighing pan to the predetermined weight.

2. Apparatus as claimed in claim 1 wherein the control means comprise electromechanical circuits.

3. Apparatus as claimed in claim 1 wherein the second control means includes a timer for regulating feed of articles from the conveyor means.

4. Apparatus as claimed in claim 1 wherein the receptacle means comprises a chute and the weighing pan comprises a pan downwardly sloping therefrom, the chute and pan being substantially parallel.

5. Apparatus as claimed in claim 1 wherein the conveyor means comprises a vibrating conveyor.

6. Apparatus as claimed in claim 1 wherein the conveyor means comprises first and second vibratory conveyors, the second conveyor being below the level of and partly overlapping by the first conveyor.

7. Apparatus as claimed in claim 1 wherein the second control means includes a solenoid arranged to open and close the first gate by a lever linkage.

8. Apparatus as claimed in claim 1 wherein the receptacle means comprises a chute and the first gate is provided in a lower portion of said chute.

9. Apparatus as claimed in claim 8 wherein the chute is integral with the conveyor means.

10. Apparatus as claimed in claim 1 wherein the weighing pan is a pan downwardly sloping from the receptacle means.

11. Apparatus as claimed in claim 10 wherein the means for releasing articles from the weighing pan comprises a second gate in the weighing pan, the second gate being controlled by the first control means.

12. Apparatus as claimed in claim 11 wherein the first control means is arranged, on receipt of a signal from the means responsive to the weight in the weighing pan signifying zero weight on the pan, to close the second gate and activate the second control means.

13. Apparatus as claimed in claim 12 wherein the second control means is arranged, on activation, to close the first gate and to control the feed of articles from the conveyor means until the required quantity of articles is attained in the receptacle means, whereupon the second control means opens the first gate.

* * * * *